United States Patent
Bullard

(10) Patent No.: US 6,758,531 B1
(45) Date of Patent: Jul. 6, 2004

(54) HUB AND HUBCAP

(75) Inventor: Morgan Bullard, Hampshire, IL (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 10/436,012

(22) Filed: May 10, 2003

(51) Int. Cl.[7] .................................................. B60B 7/16
(52) U.S. Cl. .................................. 301/37.21; 301/108.4
(58) Field of Search .......................... 301/37.101, 37.21, 301/37.102, 108.1, 108.4

(56) References Cited

U.S. PATENT DOCUMENTS

| | | | | |
|---|---|---|---|---|
| 2,535,126 A | * | 12/1950 | Flowers et al. ................ | 70/169 |
| 4,067,621 A | * | 1/1978 | Reppert ..................... | 301/108.3 |
| 4,591,211 A | * | 5/1986 | Browning et al. ......... | 301/35.52 |
| RE32,903 E | * | 4/1989 | Braungart ................. | 301/37.21 |
| 5,234,260 A | * | 8/1993 | Coombes et al. ......... | 301/108.1 |

* cited by examiner

Primary Examiner—Russell D. Stormer
(74) Attorney, Agent, or Firm—Vedder Price Kaufman & Kammholz

(57) ABSTRACT

A hubcap for a wheel hub. The hub is threaded and preferably includes several notches in its otherwise smooth radially outer end face. The hubcap has an open end terminating in a threaded end portion, a closed end and a discontinuous radial flange between the ends. One or more latching tabs fit into the discontinuities in the flange, and each tab contains a projection which fits into the notch. The tab can be manually lifted to disengage the tab from the notch, but the hubcap cannot otherwise be unscrewed.

15 Claims, 3 Drawing Sheets

HUB AND HUBCAP

BACKGROUND

The present invention relates to hubcaps and, more particularly, to a novel type of hub and a hubcap assembly for trucks and the like. The hub unit includes one set of screw threads, a plurality of notches in the flat surfaces on the radially extending sealing surfaces on the hub, and a hubcap with matching threads, a closed end and a discontinuous radial flange with at least one resilient latching tab in the discontinuity. One or more latching tab contain a formation adapted to fit in one of the notches. In one embodiment, a contoured circumferential cutout in the threaded portion of the hub accommodates a resilient O-ring or similar gasket.

The novel hubcap assembly preferably incorporates two latching tabs and a plurality, preferably 8 to 16, of notches to accommodate formations on the latching tabs. The tabs are biased by their own innate resiliency to urge the formations on the tabs into the contoured notches, and can be displaced therefrom by lifting against this resilient force. The latching formations on the tabs preferably include a rear, perpendicular or axial surface, a flat, offset surface parallel to the radial flange surfaces, and a transition or inclined surface to facilitate entry into the notches. The formation is located outwardly on the tab, and the tab may have a further, finger-engaging portion on the tab to facilitate lifting the tab out of engagement with the notch when it is desired to release the engagement between the tab formation and the notches.

In the prior art, most hubcaps, particularly truck hubcaps, have been positioned and fastened by a gasket and a number of bolts, studs or cap screws. This has caused the outer portion of the hub to be thicker than necessary, to receive the shank portion of bolts or studs. Otherwise, a flange might extend into the center of the hub, again adding difficulty in manufacturing or having other drawbacks. A few prior art hub caps have been screwed onto the hubs, but these hubcaps have lacked the latching feature and other advantages of the present invention. Consequently, these hubcaps were liable to unscrew unintentionally.

Naturally, with at least six, and occasionally as many as twelve bolts or studs for every hub, the parts count for each hub is undesirably high. In use, each stud or bolt should be torqued evenly; failure to do so may cause leakage or even failure.

With the hubcap of the present invention on the other hand, the hubcap may be screwed into any desired degree of tightness, either by applying a force by hand tightening, or with a wrench or the like, or both, of course.

Accordingly, it is an object of the invention to provide an improved, readily removable hubcap for use on a specially designed hub.

Another object is to provide a hubcap having a threaded portion on its open end and adapted to mate with a tapped or threaded hub having locking means thereon.

A further object is to provide a hubcap which can easily be attached to a hub, and tightened to any desired degree, but which cannot be accidentally loosened or removed from its installed position.

A still further object is to provide a hubcap having one or more latching tabs, at least one of which automatically engages one or more specially designed notches and which cannot be removed without intentionally biasing the latching tabs away from the notches.

A further object is to provide one or more latching tabs which flex sufficiently to enable them to be readily removed from a notch or detent.

Another object is to provide one or more latching tabs which in some embodiments are flexible compared to the radial flange with which they are radially aligned.

A still further object is to provide a hubcap with latching tabs and a hexagonal or octagonal formation on its closed end to enable it to be grasped by a wrench when installing it to its desired torque.

A further object of the invention is to provide a hubcap made from a tough plastic material.

These and other objects of the invention, including inherent objects, and the manner of their attainment, will become more clear when reference is made to the following detailed description of the preferred embodiments of the invention and to the accompanying drawings, in which like reference numbers indicate corresponding parts throughout the several figures.

DESCRIPTION OF THE PREFERRED EMBODIMENTS OF THE INVENTION

Figure 1:
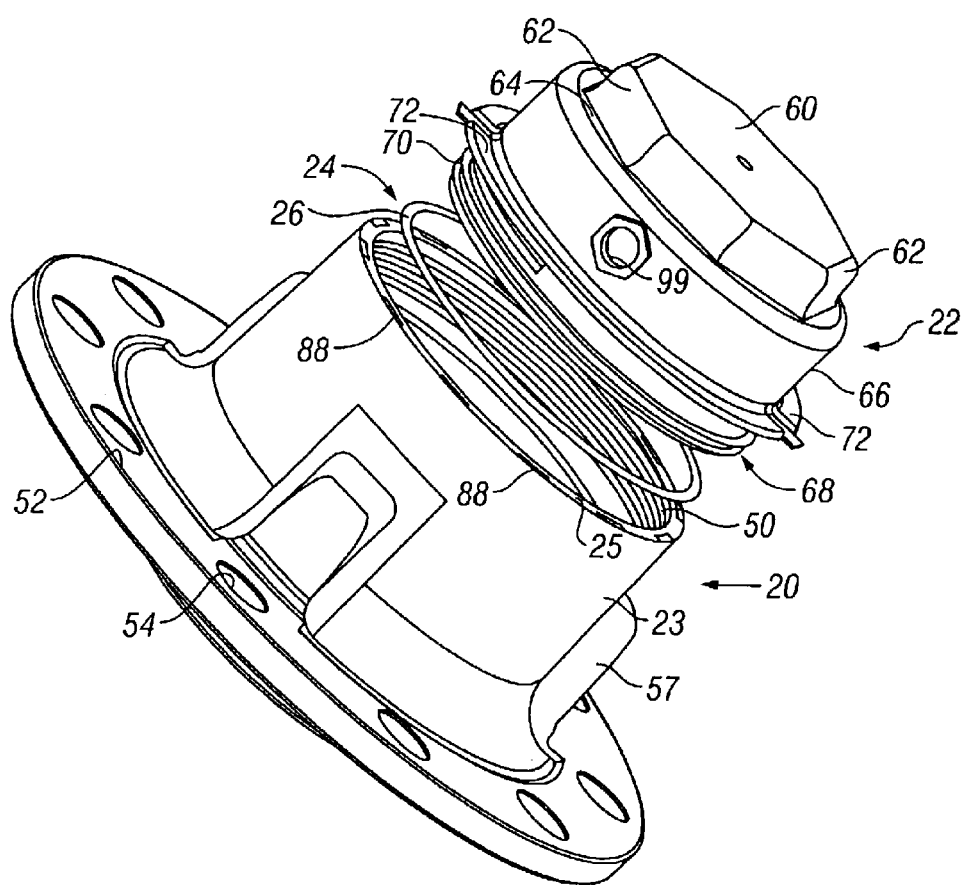
FIG. 1 is an exploded perspective view of a vehicle hub assembly showing the hub, the hubcap and a gasket.
Figure 2:
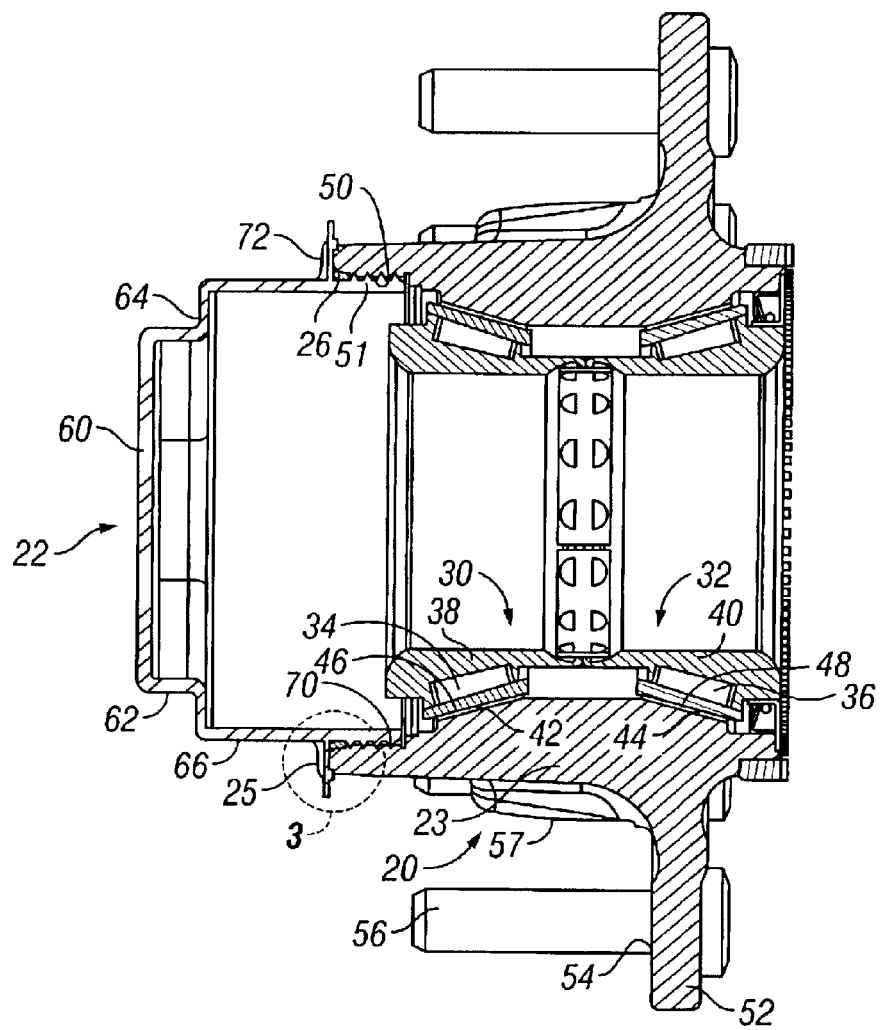
FIG. 2 is a vertical sectional view showing the hub and associated components and the hubcap in the installed position of the hubcap.

Referring now to the drawings in greater detail, there is shown in FIGS. 1 and 2, an illustration of one form of a rotary, non-driven vehicle hub assembly, with the hub being generally designated 20. FIG. 1 also shows a removable hubcap generally designated 22 thereon in a spaced apart position, with gasket means generally designated 24 in the form of a deformable O-ring 26. The hub assembly itself generally designated 20 comprises a main hub wall 23 terminating at its axially outer end in a flat radial end face 25 and a contoured portion 27 (FIG. 3) for receiving an O-ring 26.

FIG. 2 of the drawings shows that the hub generally designated 20 is journalled on axially inner and outer bearing assemblies generally designated 30, 32. Each bearing assembly 30, 32 includes tapered rollers 34, 36 running in radially inner races 38, 40, as well as outer races 42, 44 which in this case are an integral part of the hub walls 23. These tapered rollers 34, 36 are held in place by cages 46, 48. A threaded bore generally designated 50 in the hub wall 23 is provided which threadedly engages the axially inner margin generally designated 51 of the hubcap 22. The hub assembly 20 also includes other elements, such as a radial flange 52 to engage and position a wheel (not shown) with plural openings 54 being provided in the hub assembly 23 for accommodating bolts or studs 56. The hub assembly generally designated 20 also includes plural auxiliary locating elements 57 to aid in positioning the wheel and help in centering and seating the wheel.

Referring now to the hubcap 22, this unit includes a closed, axially outermost end face 60, and plural tool engaging flats 62. In addition, the hubcap contains a transition surface 64 and a hollow continuous sidewall 66. A continuous, axially innermost margin generally designated 51 of the hubcap 22 contains the threads 70 and a discontinuous radial flange 72. The radial flange 72 has an axially inner surface 74 (FIG. 3) for engaging the flat end face 25 of the hub 20, and two latching tabs generally designated 76 at the end of a somewhat flexible latching tab body portion 78.

Figure 5:
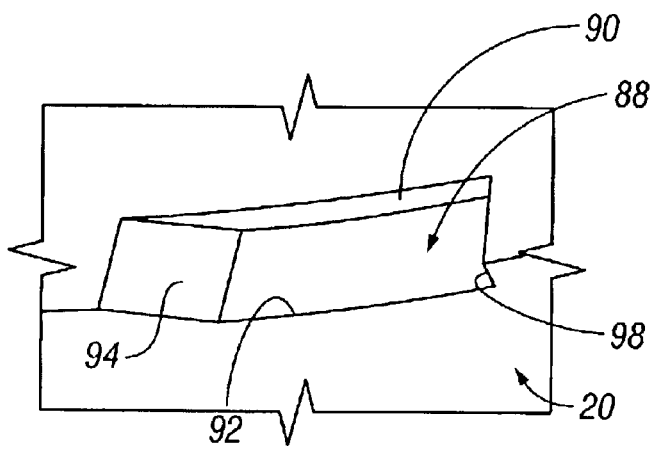
FIG. 5 is an enlarged perspective view, with portions broken away, of one of the notches in the hub radial flange surface according to the invention.
Figure 6:
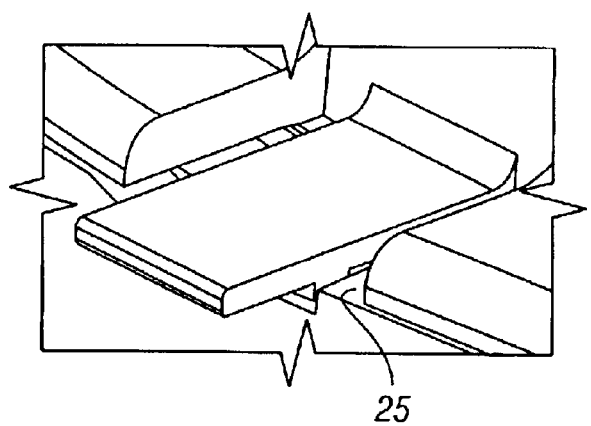
FIG. 6 is an enlarged perspective view of an embodiment of the latching tab of the invention, shown in a latched position with respect to the hub, and further showing a version of the latching tab with an extended, finger-engaging portion on the latching tab.

The latching tab 76 includes a projection generally designated 79 on its lower surfaces, including an inclined surface portion 80, an offset surface portion 82, and an end or perpendicular surface 84. The projection 79 is designed to mate with the notches generally designated 88 formed in the hub wall 23. Each notch generally designated 88 (FIG. 5) includes a radially inner wall 90, a bottom wall 92, and a ramp surface 94. In addition, the notch generally designated 88 contains a vertical end wall 98 for engaging the vertical surface or end wall 84 of the projection 79.

Figure 3:
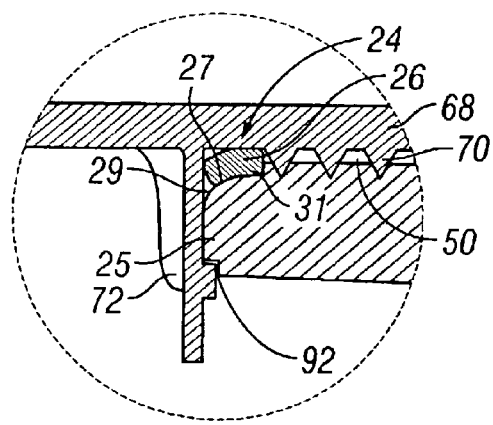
FIG. 3 is a greatly enlarged, partial sectional view of the threads engaging one another on the hubcap and hub, respectively, and compressing the gasket between the pieces.
Figure 4:
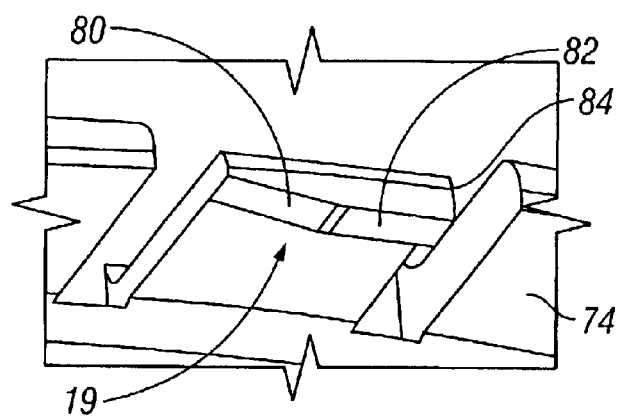
FIG. 4 is an enlarged perspective view of the latching tab and portions of the radial flange of the hubcap, and showing the structure of the projection on the latching tab.

This arrangement of the projection 79 and the notches 88 in the hub wall 23 permits relative rotation of the hubcap 22 in a clockwise direction only. When the latching tabs are displaced against their own inherent resiliency, the hubcap may be unscrewed and rotated in a counterclockwise direction. In this case, the hub may be unscrewed from its fully seated position. A plurality of notches 88 and the pitch of the screw threads 50, 70 enables the hubcap 20 to be tightened to exactly the desired torque specifications. This requires only one adjustment rather than adjusting or torquing six or eight bolts to given specifications. Owing to the provision of 8 to 16 notches 88, for example, the degree of tightening can be accurately controlled. During the tightening, the O-ring 26 or other gasket is compressed to a desired degree (FIG. 3). The contour of the pocket-contoured portion 27 is such that a certain amount of deformation of the O-ring can take place; thus, there is an inclined surface 29 which will accommodate that part of the O-ring 26 which is in excess of the straight-walled portion 31 of the pocket 27.

The hub cap 22 can also accommodate one or more fittings which will fasten in the openings 99 that are provided for the purpose of sensing tire inflation pressure or providing other sensors or other fittings for the opening 99.

In use, the novel hub and hub cap of the present invention is the ultimate in simplicity. Assuming that the hub is suitably fastened to the axle, and that the parts of the hub are correctly installed, the O-ring is positioned in the contoured portion designed to receive it. Next, the hub cap is placed with its threads beginning to engage those on the hub, and the cap is tightened with a clockwise motion. After a few turns, the formation 79 will begin to ride over the pockets 88. The formations 79 continue to engage one pocket 88 and then move on to the next pocket 88, as long as the cap is turned clockwise.

When sufficient torque is developed in rotating the hubcap, the formation 79 is seated in a pocket 88. Thereafter, the cap cannot be turned counterclockwise, either intentionally or by accident. When it comes time to intentionally remove the hubcap, a lifting force is applied to the flexible portion of the hubcap-latching tab or tabs, lifting them out of engagement with the pockets. Thereupon, the hubcap may be easily removed.

To achieve a vernier effect, the notches may be somewhat offset with respect to all but one of the tabs with formations thereon. In other words, there could be the two tabs illustrated with an odd number, say 9 or 11, notches. Thus, the tabs would only have to be rotated a small amount to achieve the object of at least one tab registering in a notch. A further alternative construction could be to provide plural latching tabs but only one notch for receiving one tab. The number of tabs and recesses would determine the amount of backlash allowed.

Of course, the threads on the hub and hubcap may be "left hand" so that one tightens them with a counterclockwise rotation and removes them with a clockwise motion. In such case the formations on the latching tabs would also be reversed.

The materials used to make the components are preferably a tough, resilient thermoplastic such as, for the hubcap, nylon, polycarbonate, or other suitable filled or unfilled material. This tough material may preferably be injection molded. With this method, forming the discontinuous flange in one piece with the hub cap, the tab and projection assembly is very simple. This method also insures that the pieces of different cross-section and thickness may be easily formed. For example, the threads, the closed end, the ring 72 and the latching lab 76 may be formed with different radial extents and with different cross-sections.

Of course, the hub 20 itself is made from a tough metal material. Other suitable materials may be used. The gasket illustrated is an O-ring accommodate de in a suitable recess. However, a flat gasket may also be used; in such case, the recess may be omitted and the flange may be flat or have one or more circumferential ribs thereon. The tabs may also be shielded, for example, by ultrasonic welding of a plastic guard strip over the tab area. In this instance, one could not lift the tabs to remove the hubcap without breaking or damaging this shielding or guard member, for example. Thus, the hubcap may be easily made tamper-evident.

Other methods or apparatus will occur to those skilled in the art and I anticipate that changes and modifications may be made without departing from the spirit of the invention or the scope of the appended claims.

What is claimed is:

1. A hubcap for a wheel hub, said hubcap being adapted to cooperate with a threaded hub and a resilient gasket member, said hub having a central bore and an annular radial face, said face being continuous at its radially inner portion and having at least one notch in its radially outer surface portion, said hubcap comprising a rigid shell having a first closed end portion, a continuous cylindrical sidewall, a radial flange and a threaded second end portion, said radial flange having a surface for exerting a sealing force on such axially outer surface of said hub, said flange being circumferentially discontinuous, said hub cap including at least one latching tab thereon, said latching tab being located in said flange discontinuity and having an axial projection thereon, said latching tab cooperating with said notch in said radially outer surface portion so as, when said hubcap and said hub are in threaded engagement with each other, to permit rotary motion in one direction and to permit rotation in the opposite direction only when said latching tab is lifted axially out of engagement with said notch in said radially outer surface portion.

2. A hubcap as defined in claim 1 wherein said hub includes a contoured recess and wherein said resilient gasket is an O-ring that fits in said recess.

3. A hubcap as defined in claim 1 wherein said hub includes plural notches in said radially outer surface portion.

4. A hubcap as defined in claim 1 wherein there are six to twelve notches in said radially outer surface portion.

5. A hubcap as defined in claim 1 wherein said hubcap includes two latching tabs.

6. A hubcap as defined in claim 1 wherein said latching tab includes an axially inner surface portion which is coplanar with the axially inner surface on said discontinuous radial flange.

7. A hubcap as defined in claim 1 wherein said axial cross-section of said latching tab is of reduced thickness in relation to the axial cross-section of said discontinuous radial flange.

8. A hubcap as defined in claim 1 wherein said latching tab includes a finger-engaging portion extending radially beyond said axial projection on said latching tab.

9. A hubcap as defined in claim 8 wherein said latching tab includes a finger engaging portion extending radially beyond the radially outer edge of said radial flange.

10. A hubcap as defined in claim 1 wherein said hubcap is made from an injection molded, filled or unfilled nylon material.

11. A hubcap as defined in claim 1 wherein said hubcap is made from an injection molded, filled or unfilled polycarbonate material.

12. A hubcap as defined in claim 1 wherein said axial projection on said latching tab includes a flat surface portion parallel to said flange, an inclined portion meeting said flat surface portion, and a perpendicular surface at one end of said projection.

13. A hubcap as defined in claim 1 wherein said number of notches in said hub and the number of latching tabs on said hubcap do not match evenly.

14. A hubcap for a hub having threads thereon for cooperation with threads on said hubcap and for capturing a resilient gasket between said hub and portions of said hubcap, said hubcap comprising threads on the axially inner end of said hubcap, an axially extending continuous side wall surface and a radially extending flange lying axially between said threads and said sidewall surface, said flange including a radially outer surface portion and a radially inner surface portion, said flange being circumferentially discontinuous and presenting a surface for abutting an axially facing surface on said hub, a latching tab having an axially inner surface presenting at least one latching formation including a beveled surface portion for passing over a cutout portion of said hub, and a rotation stop surface on said tab for engaging said cutout portion, said hub including a continuous radial surface and a plurality of cutout notches therein, said notches including plural rotation stops for engaging said stops on said hubcap flange, an axially inner surface for engagement by a hub and an end wall closing off said hubcap and rendering it impervious to fluid passage.

15. A hubcap as defined in claim 14 wherein said hubcap is made from polycarbonate, nylon, or other thermoplastic material.

* * * * *